United States Patent
Bortolotti et al.

(10) Patent No.: US 9,648,692 B2
(45) Date of Patent: May 9, 2017

(54) PORTABLE LAMP COMPRISING A CONTACT-LESS CONTROL DEVICE

(71) Applicant: Zedel S.A., Crolles (FR)

(72) Inventors: Raphael Bortolotti, Annecy le Vieux (FR); Omar Bouzghoub, Domene (FR); Nicolas Flores, Gieres (FR)

(73) Assignee: Zedel S.A., Crolles (FR)

( * ) Notice: Subject to any disclaimer, the term of this patent is extended or adjusted under 35 U.S.C. 154(b) by 0 days.

(21) Appl. No.: 14/692,954

(22) Filed: Apr. 22, 2015

(65) Prior Publication Data

US 2015/0305111 A1 Oct. 22, 2015

(30) Foreign Application Priority Data

Apr. 22, 2014 (FR) ..................... 14 00947

(51) Int. Cl.
| | |
|---|---|
| H05B 33/08 | (2006.01) |
| H05B 37/02 | (2006.01) |
| F21L 4/00 | (2006.01) |
| F21V 21/084 | (2006.01) |
| F21V 23/04 | (2006.01) |
| F21W 111/10 | (2006.01) |
| F21W 131/40 | (2006.01) |
| F21Y 101/00 | (2016.01) |

(52) U.S. Cl.
CPC ............ H05B 33/0854 (2013.01); F21L 4/00 (2013.01); F21V 21/084 (2013.01); F21V 23/0414 (2013.01); F21V 23/0471 (2013.01); H05B 33/0863 (2013.01); H05B 37/0227 (2013.01); F21W 2111/10 (2013.01); F21W 2131/40 (2013.01); F21Y 2101/00 (2013.01); Y02B 20/44 (2013.01)

(58) Field of Classification Search
CPC .... H04W 4/008; H04W 4/027; G02B 27/017; G02B 2027/0178; G02B 27/0172; G02B 2027/014; G06F 1/163; H05B 37/0218; H05B 37/0227; H05B 37/0245; H05B 37/0254; H05B 37/0272; H05B 33/0854
See application file for complete search history.

(56) References Cited

U.S. PATENT DOCUMENTS

| | | |
|---|---|---|
| 2006/0039160 A1 | 2/2006 | Cassarly et al. |
| 2010/0277074 A1 | 11/2010 | Van Endert et al. |
| 2011/0031901 A1 | 2/2011 | Huguenin et al. |

FOREIGN PATENT DOCUMENTS

| | | |
|---|---|---|
| EP | 2372914 | 10/2011 |
| FR | 1400947 | 1/2015 |

(Continued)

*Primary Examiner* — Jany Richardson
(74) *Attorney, Agent, or Firm* — Saile Ackerman LLC; Stephen B. Ackerman

(57) ABSTRACT

A portable lamp, such as a headlamp, having control of the light power without the need for any manual switch is presented. The lamp comprises a power module for powering one or more light sources, first proximity detectors for detecting an object such as a finger moving close to the lamp, in one direction or another along a first axis X-X; and a control module receiving information generated by said first proximity detectors, said control module being configured for generating, from the direction of the movement of said object, a control information for switching-on, switching-off or adjusting the level of the intensity of the light power.

23 Claims, 11 Drawing Sheets

(56) References Cited

FOREIGN PATENT DOCUMENTS

| | | | |
|---|---|---|---|
| WO | WO 2009059464 | 5/2009 | |
| WO | WO 2009133309 | 11/2009 | |
| WO | WO 2013186707 | 12/2013 | |
| ZA | WO 2013033735 A1 * | 3/2013 | ........... H03K 17/955 |

* cited by examiner

PORTABLE LAMP COMPRISING A CONTACT-LESS CONTROL DEVICE

TECHNICAL FIELD

The present invention relates to the field of portable electric lamps and in particular a headlamp fitted with a contact less control of brightness of the light beam.

BACKGROUND

There are quite a number of known effective techniques for controlling the operation of conventional electric devices, such as a standing lamp. But those conventional techniques are not properly suitable for controlling a portable lamp such as a headlamp which is conventionally controlled by means of a pushbutton or a rotary switch.

SUMMARY

It is desirable to improve the ergonomics of a headlamp and this is precisely the object of the present application. It is an object of the present invention to provide a portable lamp, such as a headlamp having an improved user interface which allows not only the control of the power-on or power-off of the lamp, but also the control of its brightness.

It is another object of the present invention to a headlamp which is particular compact and devoid of any manual switch, and which nevertheless allows a control and adjustment of the luminous flux.

It is a further object of the present invention to provide a contact less control of a headlamp, fitted with an efficient mechanism to avoid undesired switching-on/switching off.

It is finally a fourth object of the present invention to achieve a process for controlling the power-on of a headlamp, its power-off as well as the brightness of the light generated by the latter, and even its diffusion power.

These and other objects are achieved by a portable lamp having a control of the light power, which comprises:
  a power module for powering one or more light sources;
  first proximity detectors for detecting an object such as a finger moving close to the lamp,
  a control module receiving information generated by said first proximity detectors, said control module being configured for detecting the direction—positive or negative—of movement of said object along a first axis (X-X') and for deriving from such information a control of the switching-on, the switching-off or the adjustment of the intensity of the light power.

Preferably, the direction of movement of the object is used by the control module for the purpose of determining whether to increment or decrement the level of intensity of the luminous flux, whereby the user may position the lamp on his head without taking care of the right side of the positioning of the lamp.

In one particular embodiment of the portable lamp, all proximity detectors are located on a same axis X-X' at one side of said light source.

Preferably, the first proximity detectors comprise each an antenna configured for modifying the oscillation frequency of an oscillator when an object comes close to said detectors. Alternatively, the first proximity detectors can be based on an ultrasonic sensor configured for detecting the proximity of an object coming close to said lamp.

In one particular embodiment, the lamp comprises:
  first proximity detectors configured for detecting and distinguishing a movement Left-Right or Right-Left along a first horizontal axis X-X';
  second proximity detectors configured for detecting and distinguishing a movement Up-Down or Down-Up along a second axis Y-Y' substantially vertical.

In one particular embodiment, the lamp comprises an electro-optical device being located in front of the light source, such as an electro-optical diffusion element providing an electric control of the transparency/opacity, and the second proximity detectors are configured for controlling the diffusion of the light beam.

Preferably, a Polymer Dispersed Liquid Crystal (PDLC) element performs the control of the diffusion of the light beam, wherein the PDLC element is controlled by said control module from information generated by said second proximity detectors detecting a move of an object along said axis Y-Y'.

The invention also achieves a process for controlling a portable lamp, comprising the steps:
  detecting a first proximity move of type left/right or right/left and controlling the switching-on of said lamp;
  initiating a counter for establishing a time window used for allowing adjustment of the intensity of the light beam, said time window being opened during a predetermined duration;
  detecting a second proximity move during the opening of said time window;
  increasing the light intensity of the lamp when the direction of the second proximity move is the same than the direction of the first proximity move;
  reducing the light intensity of the lamp when the direction of said second proximity is reverse with respect to the direction of said first proximity move;
  switching off the lamp for any proximity move detected after the closing of said time window.

The invention is particularly adapted for the realization of a headlamp which switching-on/off may be easily controlled by a user irrespectively with the positioning side of the lamp on the user's head.

BRIEF DESCRIPTION OF THE DRAWINGS

Other features, objects and advantages of the invention will appear on reading the description and the following drawings, given solely by way of non-limiting examples, with reference being made to the accompanying drawings.

DESCRIPTION

There will now be described embodiments of a portable lamp, such as a headlamp which can advantageously incorporate an effective contact less control mechanism allowing not only to get rid of the conventional mechanical switches, but which can increase the robustness and the tightness of the lamp.

Figure 1:
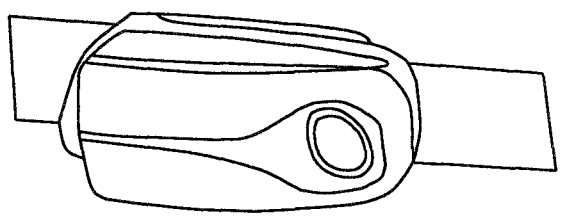
FIG. 1 illustrates a perspective front view of an embodiment of a compact headlamp according to the invention.
Figure 2:
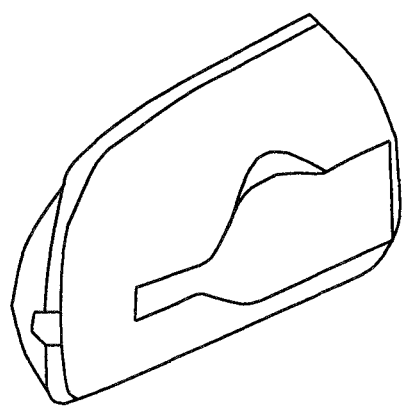
FIG. 2 shows a rear perspective view of the lamp of FIG. 1, highlighting the USB port for charging the battery.

One can thus achieve a particularly compact headlamp, such as illustrated in FIG. 1, and which is barely larger than a Universal Serial Bus (USB) which it incorporates, and being illustrated in FIG. 2, and which may particular serve for recharging the battery.

The embodiments which are described below mainly relate to a headlamp. However, it is clear that a skilled person may can easily adapt the principle of the invention to achieve any portable lamps and their control mechanisms which are described hereinafter.

Figure 3:
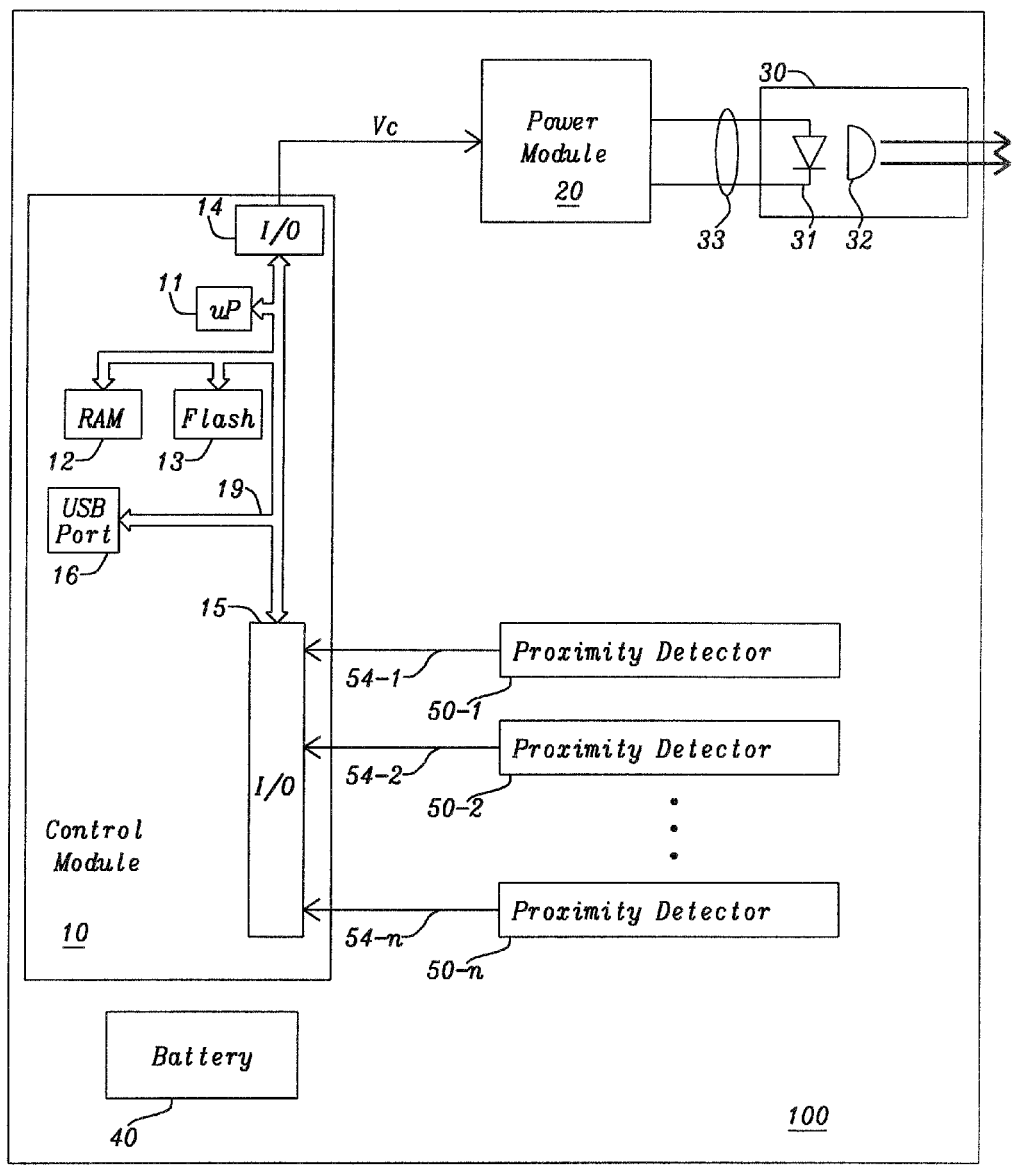
FIG. 3 illustrates a first embodiment of a portable headlamp fitted with a contact less control of the power-on/off as well as the brightness of the light flux.

FIG. 3 illustrates the details of a first embodiment of a lamp which is shown in FIGS. 1 and 2, and which achieves a contact less control of the power-on, the power-off and even the adjustment of light power.

As shown in the figure, lamp 100 includes a power module 20 associated with a control module 10 and a light source 30 comprising one or more LED (s) with, where appropriate, their own focal systems. For the sake of simplicity, in the example of FIG. 3, a single LED 31 together with its optical module 32 is represented. The LED 31 is powered via leads 33 connected to the power module 20. Such arrangement clearly achieves quite a compact headlamp structure. However, where the compactness is not mainly wished, one may arrange a set of multiple diodes within a same optical focal system or even combined to a number of optical systems for the purpose of increasing the brightness of the lamp or still for expanding the possibilities of use of the headlamp. In particular, one may consider the use of the larger multi-chip-type LED (Cree XLM2), combined with less compact optical systems so as to achieve a more sophisticated headlamp structure.

In a specific embodiment, the power supply of the LED diode 31—via leads 33—is performed under the control of control information or control signal $V_c$ generated by control module 10.

Power module 20 specifically includes all the components that are conventionally present in a LED light lamp for producing a light beam having a high intensity, and in general based on the Pulse Width Modulation (PWM), which is well known to the skilled person and which is similar to what is known in Class D audio circuits. Such PWM, pulse width modulation is controlled by means of a control signal $V_c$. Generally speaking, one will observe that the term "signal" mentioned above refers to an electrical quantity—current or voltage—used for controlling the power module 20, and particularly the PWM modulation used for powering the LED diode 31. This is however only one particular embodiment, and it is possible to replace the "control signal $V_c$" by "control information", e.g. a logical information that can be stored in a register or in memory and thus transmitted by any appropriate means to power module 20 so as to control the brightness of the luminous flux. In one particular embodiment, one may even consider that both control module 10 and power module 20 are integrated into a single module or integrated circuit.

A person skilled in the art will readily understand, therefore, that when we refer to a "control signal $V_c$", one equally contemplates the use of embodiments based on an electric control variable—current or voltage—as well as embodiments in which the control is performed by means of a logic information conveyed to the power module 20. For this reason, we will discuss below indiscriminately control signal or control information.

In general, the components, switches and circuit, that make up power module 20—e.g. bipolar transistors, Field Effect Transistors (FET) or Metal Oxide Semiconductor (MOS) or Metal Oxide Semiconductor Field Effect transistors (MOSFET)—are well known to those skilled in the art and the description will be deliberately reduced in this regard for the sake of conciseness. Similarly, the reader is referred to the general literature on various aspects of the PWM modulation.

In the preferred embodiment which is illustrated in FIG. 3, control module 10 has a microprocessor based architecture which comprises a processor 11 communicating via conventional address, data and control buses 19 with a memory device, for instance a Read Access Memory (RAM) 12, a Flash memory 13, a Read Only Memory (ROM) or Electrically Erasable Programmable Memory (EEPROM) etc. . . as well as input/output I/O circuits. FIG. 3 illustrates one embodiment having two I/O circuits, respectively 14 and 15, which may be combined, when appropriate, into a single circuit for interfacing, on one end, the power module 20 receiving control information $V_c$ and, on the other end, a set of n proximity detectors 50-1, to 50-n, with n being equal or greater than 2.

In one particular embodiment, the headlamp also includes a USB port (shown in FIG. 2) which can be accessed via a USB module 16 located within control module 10, and which communicates with the address, data and control buses 19. Such USB control interface may serve, not only for recharging a battery (e.g. Li-Ion) 40 present in the headlamp, but also for the exchange of configuration data allowing the storing of adjustment parameters and profiles within the headlamp.

In this way, the control module can communicate with a data processing system, such as a computer, a laptop, a touch pad, a personal assistant and even a conventional smart phone for the purpose of configuring the headlamp. It should be noticed however that the USB port is only an illustrative example of the numerous possibilities of communication that may be used between the headlamp and a computer/touchpad/smartphone. The skilled person may consider the use of any other communications means, in particular wireless communications (bluetooth, wifi, etc. . . ). In one particular embodiment, the headlamp stores its own Internet Protocol (IP) address so as to allow easy configuration, for instance via a dedicated web server.

Such communication is particularly advantageous especially for the exchange of configuration information, such as "profiles", that may serve for storing within the headlamp memory, as appropriate, adjustments data and settings according to its intended use by its owner. In particular, configuration data can be stored within the headlamp to set a specific personalization of the control method described below, and in particular the parameters of the lamp setting window. Alternatively or additionally, the "profiles" may be used for allowing the activation of specific procedures or operating modes, including a so-called "reactive" or "dynamic" mode allowing automatic control of the brightness of the lamp, with a possibility to de-activate (static) or activate (dynamic) the regulation in accordance with the particular profile being selected.

Generally, the proximity detectors 50-1 to 50-n allow the detection of the proximity or vicinity of an object, such as a finger for example, being close to the headlamp. Each proximity detection circuit generate an information that is representative of such vicinity which is transmitted, respectively via circuits 54-1 to 54-n, to the input/output module 15 located within control module 10.

Figure 6A:
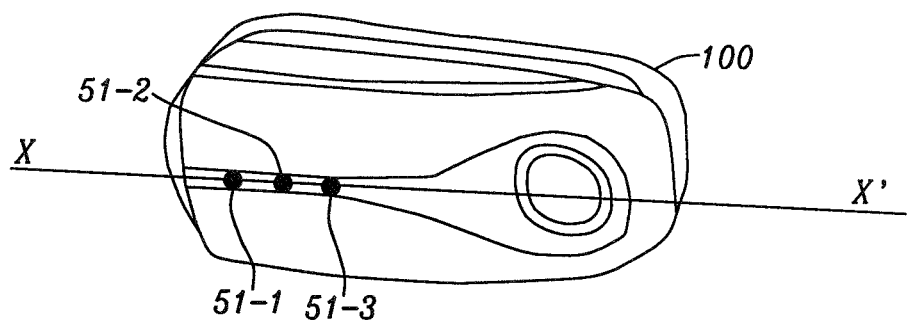
FIGS. 6a and 6b illustrate respectively two examples of arrangement of the respective antennas of proximity detection devices along an axis XX'.
Figure 6B:
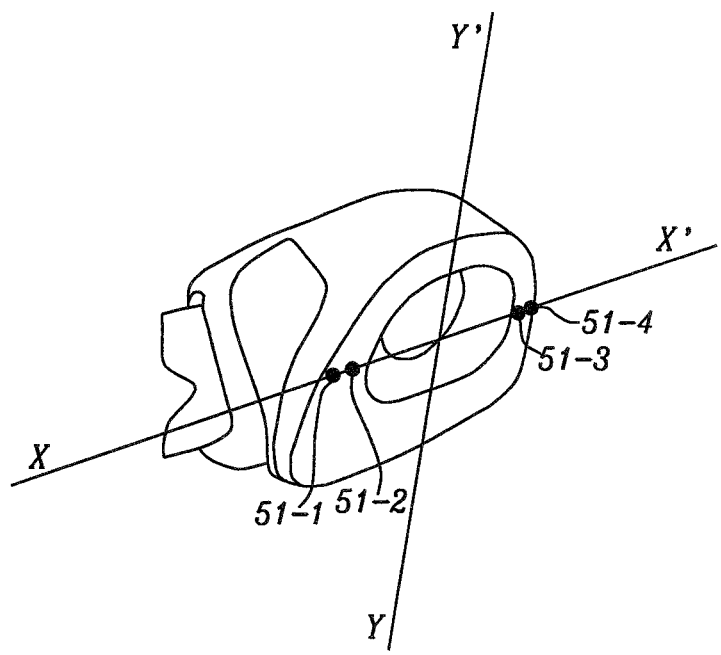
Figure 7:
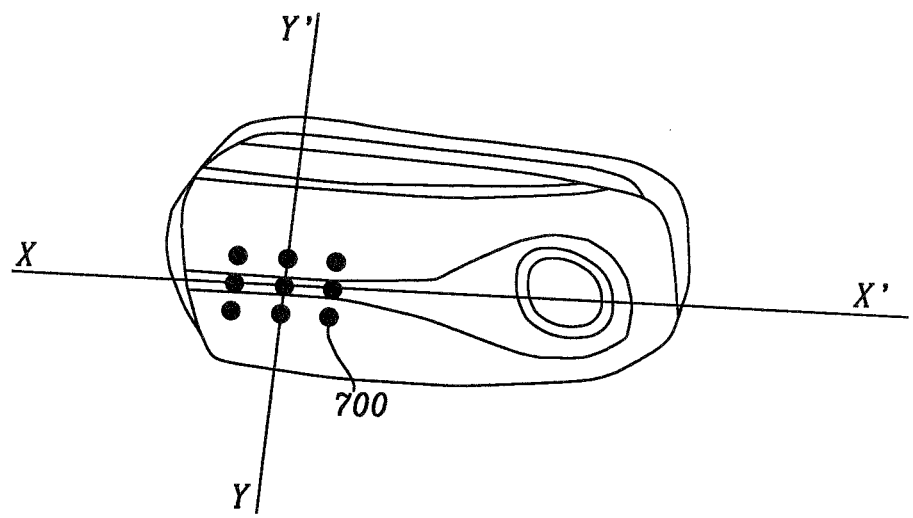
FIG. 7 illustrates another example of an arrangement of antennas according to two axes XX' and YY', respectively perpendicular, so as to a achieve the detection of the movement of an object, along two perpendicular axes.

Thus, control module 10 receives a set of data/information which are generated by the proximity detectors 50-1 to 50-n, which information can be processed by means of suitable algorithms based on program code stored in its memory, so as to derive from such information the direction of movement of the object along a first axis XX', particularly shown in FIGS. 6a, 6b and 7, for the purpose of translating such movement into an effective power-on/off control instruction or an instruction for controlling the level of the brightness.

Figure 4:
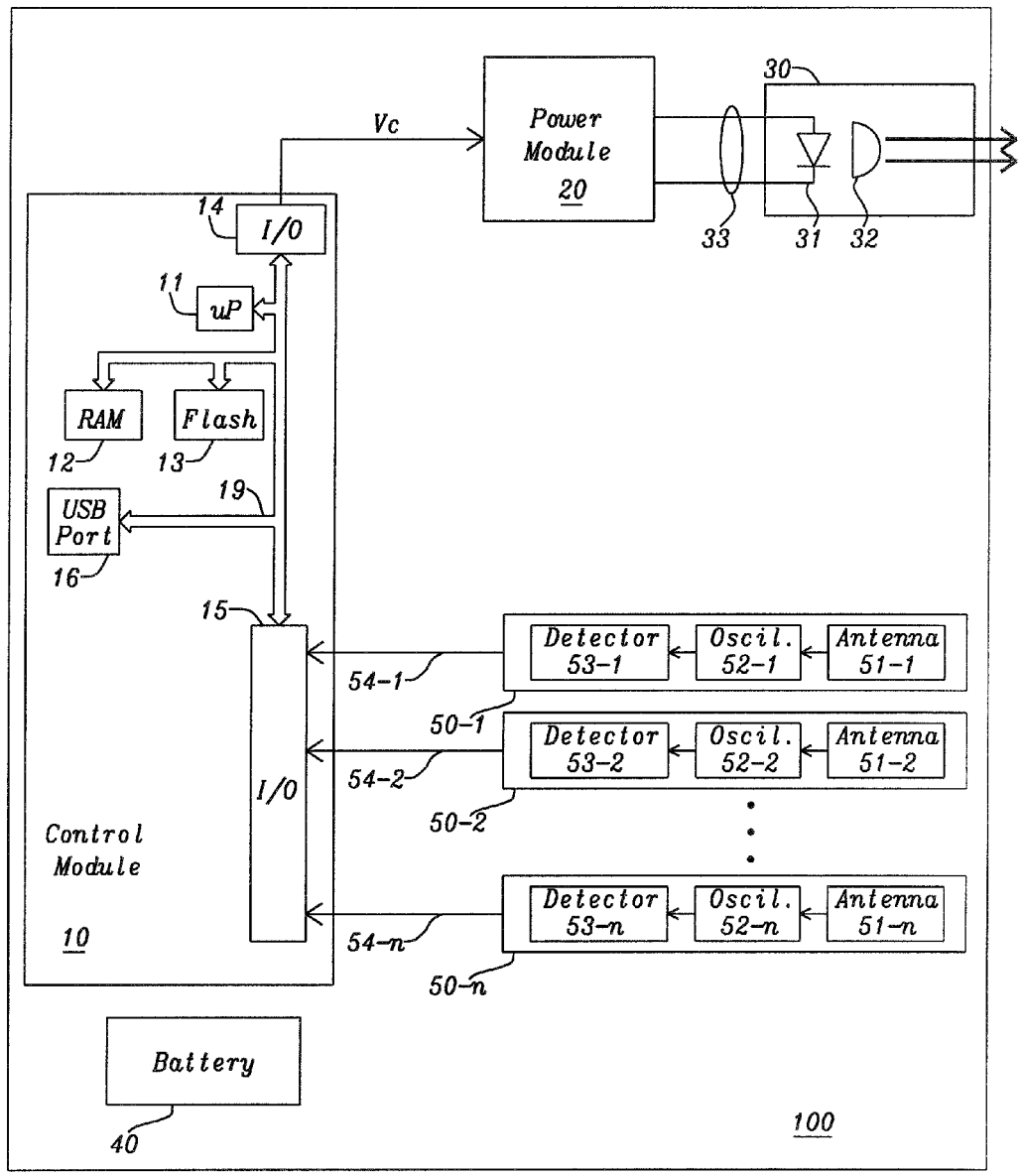
FIG. 4 illustrates a second embodiment of a headlamp, wherein the proximity detection circuits are based on an antenna.

FIG. 4 illustrates a second embodiment of a headlamp, wherein each proximity detector, for example proximity detector 50-1 (resp. 50-2, . . . 50-n) is based on an antenna 51-1 (respect. 51-2, . . . 51-n) connected to an oscillating circuit 52-1 (resp. 52-2, . . . , 52-n). The presence of a finger or any other object being close to the antenna 51-1 (resp. 51-2, . . . 51-n) has the effect of lowering the frequency of oscillation of oscillator 52-1 (resp. 52-2, . . . 52-n), which lowering is detected by a corresponding sensor 53-1 (resp. 53-2, . . . 53-n), which then transmits a corresponding information to control module 10 via leads 54-1 (resp. 54-2, . . . , 54-n).

Figure 5A:
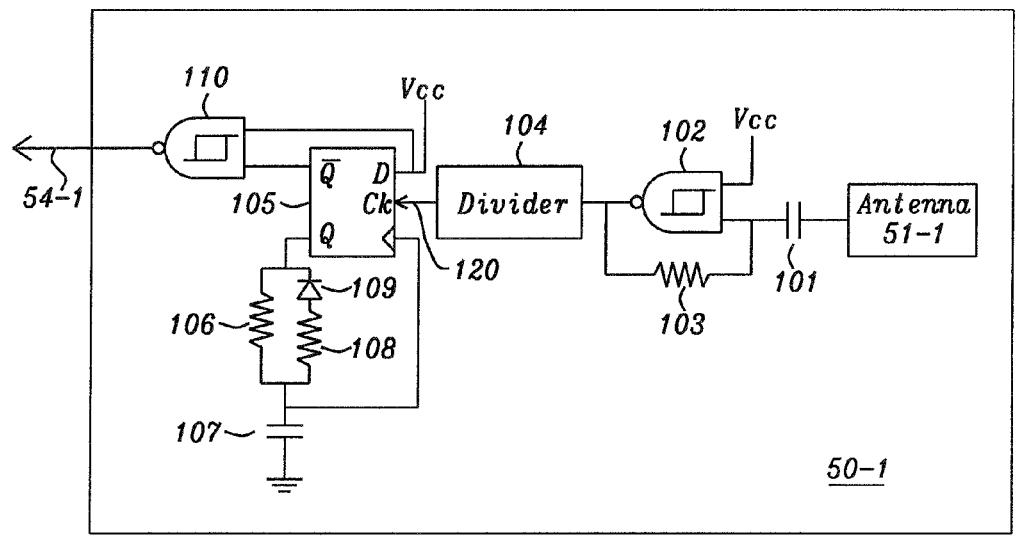
FIG. 5a shows an example of an electronic circuit used for embodying the proximity detector of the second embodiment.

For the sake of illustration, FIG. 5a particularly shows one practical embodiment of a proximity detector 50-1 which can be used in the second embodiment illustrated in FIG. 4.

One sees that antenna 51-1 is connected via a capacitor 101 to a first input of a NAND gate 102—of the Schmidt Trigger type—whose second input is connected to a Vcc potential representative of a logic level "1". A resistor 103 is connected between the first input of NAND gate 102 and its output so that that the combination of elements 101-103 achieve an oscillating circuit at a frequency determined by the product of the capacitance value 101 with the value of resistor 103, for example of the order of 500 000 Hz. The output of NAND gate 102 is connected to the input of a frequency divider integrated circuit 104 for generating a square signal 120 having a lower frequency, for example of the order of a few hundred Hertz, which is then passed to the clock input (CK) of a flip-flop circuit 105, whose D input is connected to the Vcc voltage, corresponding to a logic level "1". The Q output of flip-flop 105 is connected to a first terminal of a resistor 106 and to the cathode of a diode 109, whose anode is connected to a first terminal of a resistor 108. The resistor 108 has a second terminal which is connected to the second terminal of resistor 106 and also to a first terminal of a capacitor 107 and to the reset input (reset) of latch 105. Finally, the second terminal of capacitor 107 is connected to ground.

Latch 105 includes a complementary output which connected to a first input of a NAND gate 110 whose second input receives the clock signal 120 generated by the output of the frequency divider integrated circuit 104.

The circuit operation is as follows. Frequency divider circuit 104 generates at its output a square wave having a frequency of the order of several hundred Hertz, wherein the frequency decreases when an object such as a finger comes close to the antenna.

When the output of circuit 104 generates a rising edge, the logic level "1" that is present at the "D" input of latch 105 is transmitted to the output Q, thus causing the charging of capacitor 107 through resistor 106 being connected in series. Diode 109 is connected in reverse. When the potential of the capacitor 107 reaches the triggering value of the reset input of flip-flop 105, the latter is reset to zero resulting in a low logic level at the Q output and correspondingly a "1" level at the complementary output. This "1" level is transmitted to the first input of NAND gate 110. At this time, the capacitor 107 is rapidly discharged via diode 109 and resistor 108 which has a resistance value being lower than that of resistor 106, so as to prepare the processing of the next rising edge at the clock input of flip-flop 105.

In general, as this is known to a skilled person, the clock signal has a duty cycle of 50/50 with a high level during the first half of the cycle and a low level during the other half cycle. Consequently, during the first half of the cycle, the first input of NAND gate 110 is at a logic level 1. During the charging of capacitor 107, the complementary output Q is at a low level, so that the output NAND gate 110 remains at a high state.

The values of the components are selected so as to prevent, in a "normal situation" wherein no object is close to antenna 51-1 and thus detected—the reset of latch 105 during the first half of the cycle so that the output of NAND gate 110 is constantly at a high state.

In contrast, if an object comes close to antenna 51-1, the oscillation frequency tends to decrease which, without changing the duty cycle, significantly increases the duration of the first half of the cycle during which the CK input clock is at a level 1.

If the frequency falls sufficiently, this causes a possibility of reset of flip-flop 105 during the first half of the cycle. This results in a switching of NAND gate 110 that will generate a warning signal via circuit 54-1 for the attention of control module 10 of the headlamp.

As seen, the combination of flip-flop 105 and NAND gate 110 achieves a frequency detector which allows the generation of a logical signal when the oscillation frequency falls sufficiently. Clearly, this is only a specific example of an embodiment, which a skilled person may adapt and modify to fit multiple needs.

Figure 5B:
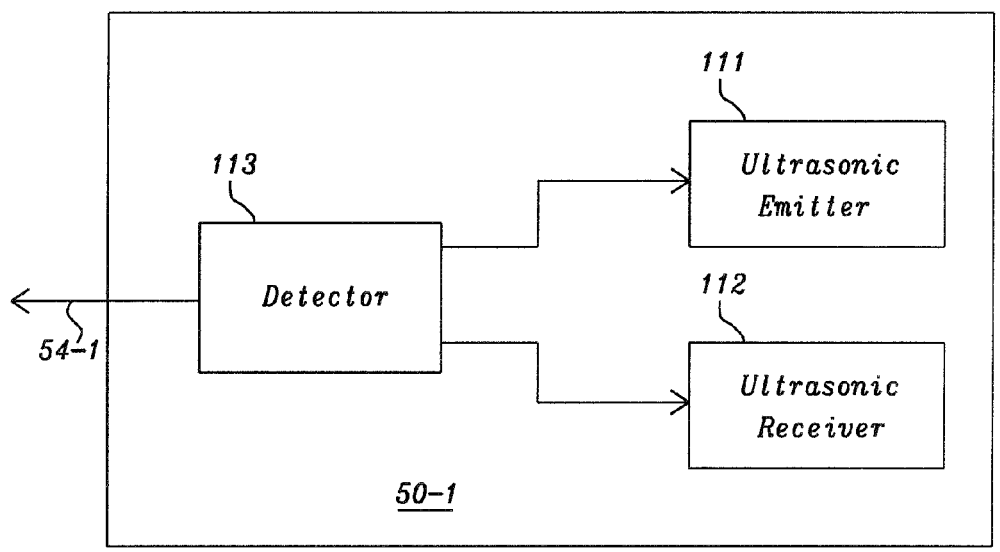
FIG. 5b illustrates a third embodiment of a headlamp, wherein the proximity detectors are based on an ultrasonic sensor.

Moreover, the frequency detection is only one possible embodiment and FIG. 5b shows a third embodiment which incorporates an ultrasonic sensor for determining whether an entity approaches close to the lamp, and this without requiring any mechanical contact. For this purpose, an ultrasonic transmitter 111, based on a piezoelectric transducer, generates ultrasonic waves that are reflected on a nearby object and which can be received by a receiver 112 generating a voltage representative of the received sound vibrations. As this is known to those skilled in the art, the ultrasonic detectors can thus be used to determine the distance to an object or an entity on the basis of the estimate of the time between the sending of a acoustic wave and receiving an echo of the wave reflected by the object.

A specific detection circuit 113 shown in FIG. 5*b* can thus analyze the signal generated at the output of receiver 112 so as to derive information being representative of a detected object, which information can then be transmitted to the control module 10 via the conductor 54-1.

Clearly, the embodiment of FIG. 5*b* is, again, a particular non-limiting example and other embodiments may be envisaged by a skilled person, in particular based on the detection of a change a magnetic field or a change in the value of a variable capacitor etc. . . . . .

For the sake of illustration, FIG. 6*a* shows one possible arrangement of positions taken by a set of three antennas 51-1, 51-2 and 51-3 on a headlamp 100, and corresponding to as many (not shown) proximity detectors. Clearly, the positions shown in FIG. 6*a* are given only for illustration purposes and are generally not apparent on the final product on the market, which therefore shows a particularly attractive aesthetical design.

In the headlamp of FIG. 6*a*, it is thus seen that the three antennas are disposed on the same side relative to the light source (on the right), and aligned on an axis XX', allowing the detection of a movement of an object (such as a finger) along such axis XX'. In practice, to achieve a robust and efficient control of the lamp, control module 10 of FIG. 4 execute a set of algorithms implemented by processor 11 so as to achieve a data processing of the information transmitted respectively by each of the detector circuits proximity 50-1, 50-2 and 50-3. In one particular embodiment, the processing will check the plausibility of the switching of electrical signals generated by each of the proximity detectors, including the delay between such switchings for the purpose of validate or not such information. The algorithm can thus check that the movement of a finger being in front of lamp 100 of FIG. 6*a* will result in a perfectly linear sequencing of signals transmitted by each of the proximity detector since the antennas are disposed equidistantly on the same axis XX', that will validate the processing algorithm implemented by the processor 11 in the control module 10.

FIG. 6*b* illustrates another embodiment of a lamp which shows an arrangement of antennas being positioned on each side of the light source with two antennas 51-1 and 51-2 being located at the left of the light source while two other antennas 51-3 and 51-4 are located at the right of the light source.

Clearly, any other arrangement may be envisaged depending on the axes along which it is desired to discriminate the movement of an object/finger (such as the axis YY' schematically shown in FIG. 6*b*).

Thus, FIG. 7 illustrates another example of provision of a new set of antennas in a matrix 700—formed 3×3 positioning points—showing two axes XX' and YY' being respectively perpendicular so as to allow the discrimination of motion of an object following the two axes XX' and YY'.

Proximity detection which is performed by means of the arrangement of antennas, such as illustrated in FIG. 7, allows the control of the switching-on or switching-off of the lamp, in accordance with the steps below:
 detection of a first proximity movement of an object/finger in front of the lamp, and identification of the type of the movement left/right or right/left, then followed by the switching-on of the lamp;
 start of a counter generating a time window used for adjusting the intensity of the light produced by the lamp;
 detecting of a second proximity movement of said object/finger being moved in front of the lamp during the said adjustment window;
 comparison of the direction of the second movement with respect to that of the first movement and:
 Increase of the intensity of the light produced by the lamp when the second movement is identified to have the same direction than the first movement which caused the switching-on of the lamp;
 reduction of the intensity of the light produced by the lamp when the second motion is identified to have a reverse direction than the first movement which caused the switching-on of the lamp.
 switching-off the lamp in response to the detection of any proximity movement of said object/finger occurring after said adjustment window.

Figure 8A:
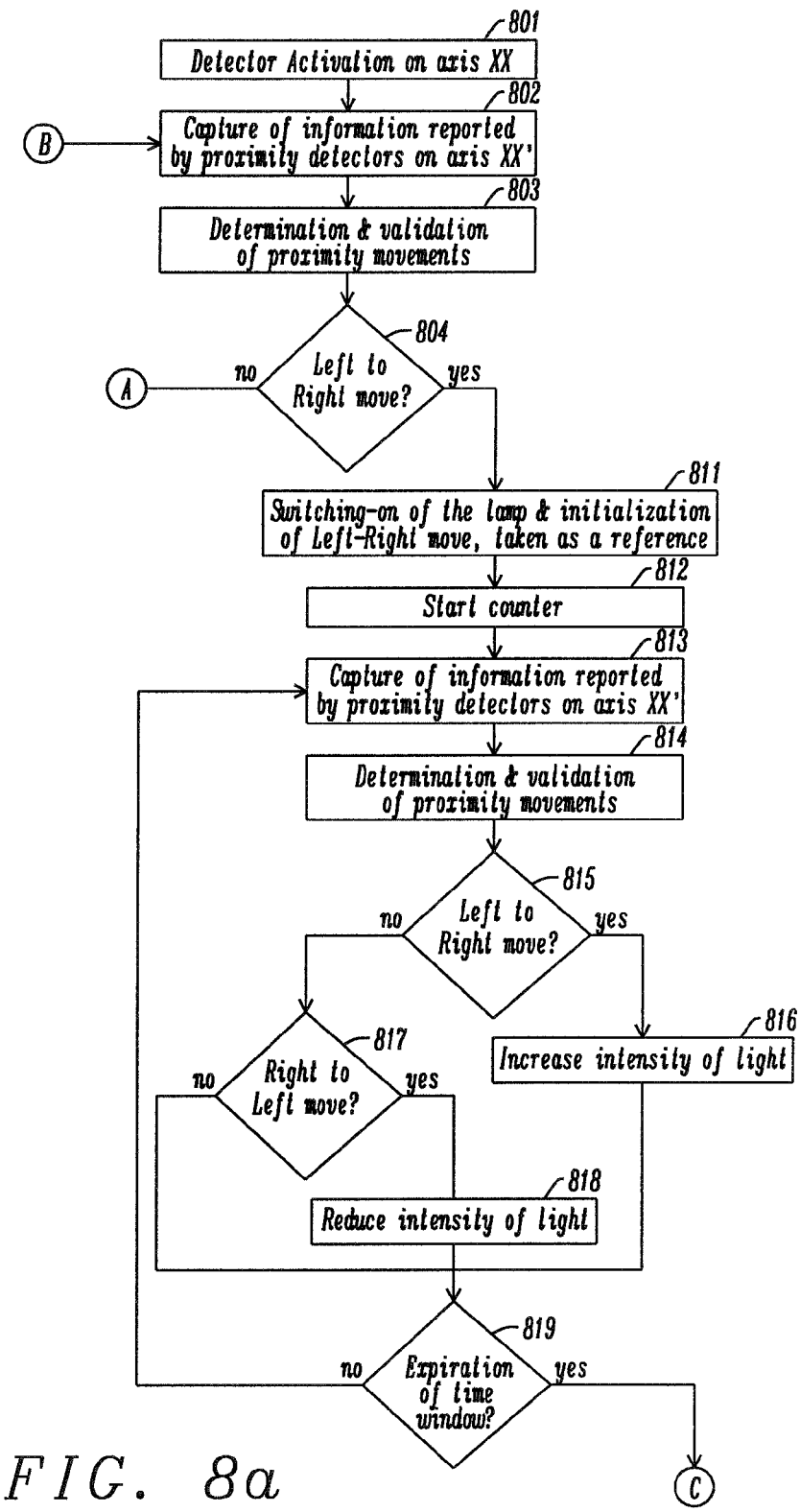
FIGS. 8a and 8b illustrate an embodiment of a process for controlling the adjustment of the brightness as well as the power-off of a headlamp fitted with proximity detectors.
Figure 8B:
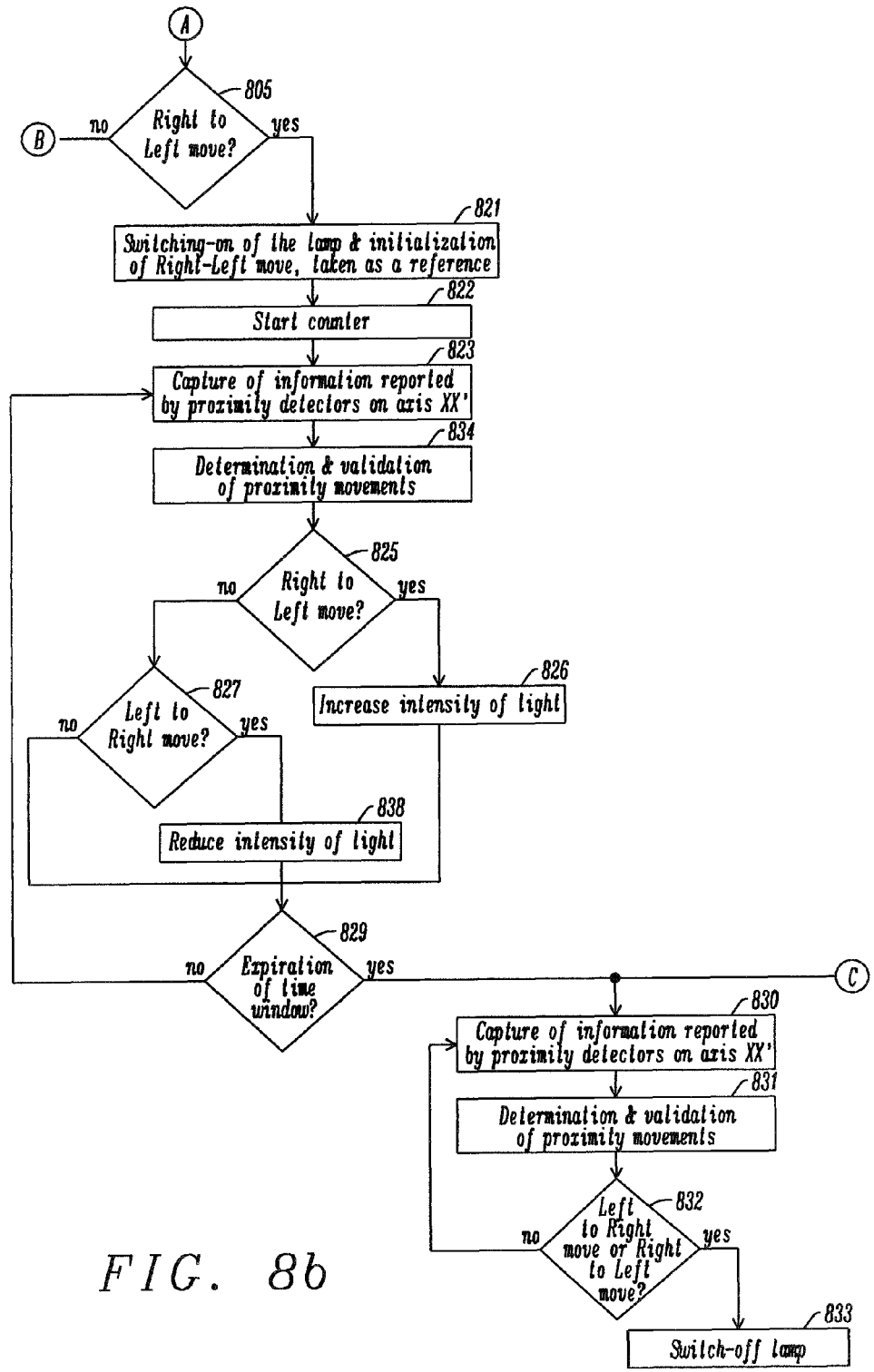

For purposes of illustrating the wide number of possibilities offered by the invention, FIGS. 8*a* and 8*b* illustrate the details of an embodiment of a process for controlling the power-on off a headlamp fitted with proximity sensors, or the adjustment of the light produced by that lamp or still the controlling of its power-off.

The method starts with a step 801 consisting of the activation of the detectors positioned on an axis XX'.

Then the method proceeds with a step 802 step wherein control module performs the capture/sensing of the information generated by detectors 50-1 to 50-n, in particular positioned on the axis XX'.

Then the method proceeds in a step 803 an analysis of these detection information, in order to operate a validation of this information and ultimately determine the existence of a movement in front of the lamp and the actual direction of movement. As mentioned earlier, the validation will be done through various audits, for example, the likelihood detections reported by a series of three straight following detectors positioned the XX' and will thus, in turn, detect switching the oscillation frequency. Clearly multiple algorithms for verification and validation are possible and at the discretion of a skilled person.

Then, in a step 804, the method performs a test to determine if a movement from the left to the right has been detected and validated, in which case, the method continues with a step 811 and, otherwise, with a step 805.

In step 811, the process proceeds to the switching-on of the lamp and the initialization of the latter to consider the LEFT-RIGHT direction as a reference for determining the positive direction of increasing light intensity.

Then, in a step 812, the process initiates a timer for the purpose of establishing a time window allowing the user to adjust the power of the light beam generated by the lamp.

The process then continues with a step 813, in which the control module 10 performs the capture/sensing of the detection information given by the proximity detectors 50-1 to 50-n, similar to the previous step 802.

Then the process then proceeds with a step 814, similar to step 803, to detect and validate the direction of a proximity move possibly detected by detectors 50-1 to 50-n.

Step 815 is a test designed to compare the direction of the move identified in the second detection with respect to the direction of move which was determined during test 804, and taken as reference.

Thus, if the second movement is identified as a movement of the Left to Right, then the process proceeds with a step 816 and, otherwise, to a step 817.

In step 816, the process proceeds to increase the light intensity of the lamp by means of a command or of a suitable control signal Vc transmitted to the power circuit 20. Then the process goes to step 819.

In step 817, the process tests the second potentially identified movement and determines whether such movement is a movement from the Right to the Left, in which case the process continues with a step 818 and, otherwise, goes to a step 819.

In step 818, control module 10 controls a reduction of the intensity of the light produced by the lamp. Then, the process continues with step 819.

As seen, thanks to the advantageous combination of the above described steps, the first direction of the move of the object/finger that was used for switching-on the lamp is then used as a reference for determining the positive direction of variation of the light intensity.

The result is a significant advantage for the user not to have to worry about the accurate positioning of the lamp (particularly in the case of a compact lamp) that can be affixed on his head without taking care of how it is positioned, while maintaining the possibility for the user to use the same "gestures" and finger movements for controlling the lamp.

Thus, with a finger movement in the Left-Right direction, the user controls the switching-on of the lamp and may, pursuing the same sweeping motion, increase the intensity of the light beam. With a sweep in the opposite direction, the light reduces the power of the light beam.

One thus achieves a particularly efficient and ergonomic control of the lamp, without requiring manual switches.

Returning to the process illustrated in FIGS. 8a and 8b, it can be seen that step 819 is a test to determine if it reaches the end of the count corresponding to the expiration of the time window set in step 812.

As is not the end of its count, the process returns to step 813, thereby allowing the user to continue the adjustment of the lamp power by appropriate fingers movements.

In contrast, at the expiration of the time window, for example occurring after 30 seconds, the process continues with a step 830, which is a first step of a final sequence of steps 831-833 allowing the user to switch-off the lamp.

If the test of step 804 does not reveal a movement of an object/finger from the left to the right, the process continues with a step 805 which is a test for determining, on the contrary, whether a reverse movement from Right to Left has been identified and validated, in which case the process goes to a step 821 and, otherwise, returns to step 802.

In general, steps 821-829 correspond to the previous steps 811-819 described above.

In a step 821, the process proceeds to the switching-on of the lamp and the initialization of the latter with the Right-Left movement taken as reference for future comparison with a potential new movement along the axis XX'.

In a step 822, the start of a counter is initiated so as to establish a time window for allowing the adjustment of the light power.

Then the process proceeds to a step 823 wherein control module 10 performs the capturing of the information reported by proximity detectors 50-1 to 50-n.

Then the process continues with the validation of this information in order to determine the occurrence of a new proximity move in a step 824, the direction of which being tested in a step 825.

If the new proximity move corresponds to a move from Right to Left, in step 825, the process proceeds with a step 826, and otherwise, proceeds to a step 827.

In step 826, control module 10 generates a suitable control information or control signal which is transmitted to power module 20 so as to increase or increment to a predetermined fraction of light generated by the lamp. The process then continues with step 829.

In step 827, the process determines if the identified movement is a movement from the Left to the Right, in which case, the process continues with a step 828 and, otherwise, goes to a step 829.

In step 828, control module 10 generates a suitable control information or control signal for the purpose of reducing the light intensity of the lamp, and the process then proceeds to step 829.

As was described before in relation to step 819, step 829 is a test to determine the expiration of the time window allow the adjustment of the light power. Indeed, if the count comes to an end, the process continues with a step 830 and, otherwise, the process returns to a step 823 allowing the user to continue the adjustment of the lamp power.

In subsequent steps 830-833, the time window for setting the parameters is closed and, therefore, any new movement, whether a movement from the left to the right or a movement in the opposite direction will only cause the switching-off of the lamp, as described with the sequence of steps described below.

More specifically, a step 830 corresponds to the capture by control unit 10 of the information detected by proximity detectors 50-1 to 50-n.

Then in a step 831, this information is analyzed and validated to determine a proximity motion.

Step 832 is a test to identify a type of proximity move, being either Right-Left or Left-Right, in which case the process continues with the switching-off of the lamp in a step 833.

Figure 9:
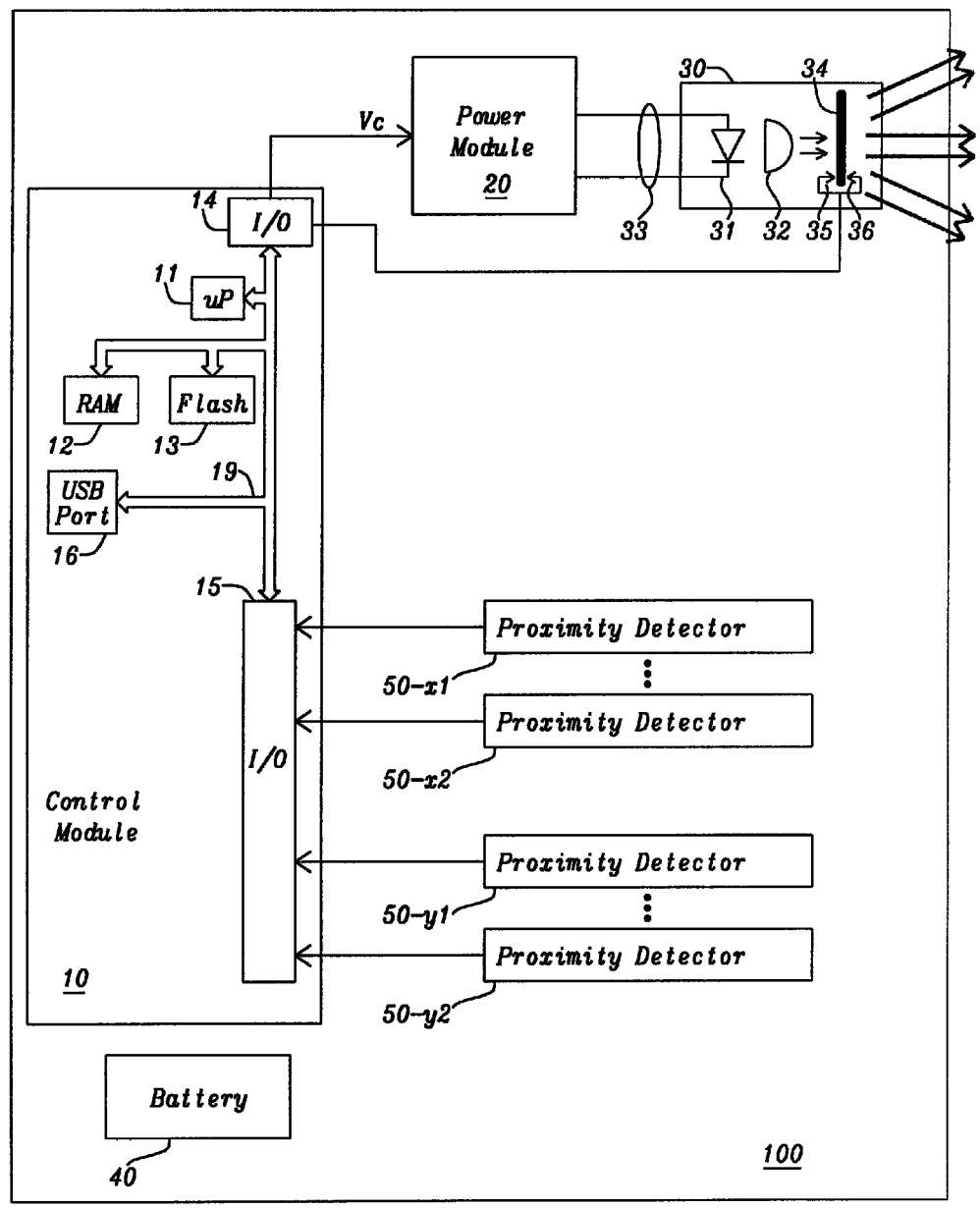
FIG. 9 illustrates a fourth embodiment of a headlamp further comprising a contact less control of the diffusion of the light beam.

FIG. 9 illustrates a fourth embodiment of a headlamp which further comprises a contact less control of the geometry of the light beam and particularly the control of the diffusion coefficient of the light beam.

In order to simplify the presentation, the components that are similar to those already described retain their reference number. Thus, the headlamp of FIG. 9 still comprises battery 40, control module 10 having a processor 11 communicating via address/data/control busses with RAM memory 12, flash memory 13 as well as input circuits/output I/O 14 and 15.

Similarly, power control module 20 allows the power supply to the light source 30, and in particular of the or LED (s) 31 via conductors 33.

The lamp comprises a light source 30 generates a light beam generated for example by means of one or more LED (s). The light source 30 may be provided with a primary optics for providing first collimator so as to allow the formation of a relatively narrow beam.

Optionally, a secondary lens 32 may be provided to improve, as necessary, the collimation of the source and thus increase, as appropriate, the narrow beam geometry.

The lamp further comprises an electro-optical device 34 arranged in front of the light source, such as an electro-optical diffuser permitting electrical control of the transparency/opacity, so as to control the geometry of the light beam generated by the LED(s).

Preferably the electro-optical device 34 consists of a Polymer Dispersed Liquid Crystal (PDLC) which, as known by those skilled in the art, is based on a particular implementation of crystals liquid within a polymer matrix through heterogeneous dispersion The PDLC film can advantageously replace the glass which is usually arranged in front of the light source and protecting the latter. The PDLC film comprises two electrodes 35 and 36 of polarization for receiving a control signal, for example a control potential generated at the output of Input/Output module I/O 14. This provides an advantageous combination of a specific narrow light source and an electro-optical diffuser PDLC that can be electrically controlled so as to produce beams of various shapes, from the narrowest beam (when the PDLC film is fully transparent) up to the maximum diffusion wherein the light is diffused in all directions, as illustrated in FIG. 9. With this particularly advantageous arrangement, it is thus possible to generate, by means of a single light source having a narrow beam, a wide possibilities of diffusion angles. And these new features will be provided while significantly reducing the dimension of the lamp since, in the best case, only one single LED is required for producing a wide variety of light beams, which will also produce a perfectly even color.

In the embodiment of FIG. 9, there is shown an arrangement of two distinct sets of proximity detectors communicating with control module 10 through I/O circuit 15, respectively a first set illustrated by detectors 50-x1 and 50-x2 together with a second set of detectors 50-y1 and 50-y2. The two sets of detectors achieving the detection of a proximity move along two perpendicular axes XX' and YY', respectively, as illustrated in the lamp of FIG. 6b or that of FIG. 7.

The first set of proximity detectors (illustrated by detectors 50-x1 and 50-x2) serve for generating information and/or a signal to be forwarded and processed by control module 10 for the purpose of detecting a proximity move along axis XX'.

Conversely, the second set of proximity detectors (illustrated by detectors 50-y1 and 50-y2) is intended to generate information and/or a signal to be forwarded and processed by control module 10 for the purpose of detecting a proximity move along axis YY' perpendicular to the axis XX'.

In this way, control module 10 is capable, thanks to an analytical processing of the information produced by the proximity detectors and appropriate algorithms, to generate control information or a control signal $V_c$ to be forwarded and processed by power module 20 for the purpose of automatically controlling the switching-on/off of the lamp and/or the power light. Moreover, control module 10 is also capable of producing a set of two control voltages transmitted to terminals 35 and 36 of PDLC film 34, for the purpose of controlling the diffusion of the light beam passing through the PDLC film.

More specifically, the diffusion control is such that in the absence of any voltage between terminals 35 and 36, the level of diffusion produced by PDLC film 34 is at its maximum, thus generating light rays in all directions (as illustrated in FIG. 9). Conversely, when control module 10 generates a significant voltage of the order of several tens of volts between the two terminals 35 and 36,—the PDLC film proves to be totally or almost totally transparent, so that only a narrow beam is finally generated by the portable lamp.

One can thus significantly improve the control of a lamp having sophisticated functionalities. One may even adapt the teaching of the invention so as to apply its principle to a so-called "dynamic" or "reactive" lamp known in the art, by incorporating such an electrically controllable PDLC as described in patent application WO2009/133309 filed by the applicant of the present patent application.

Figure 10A:
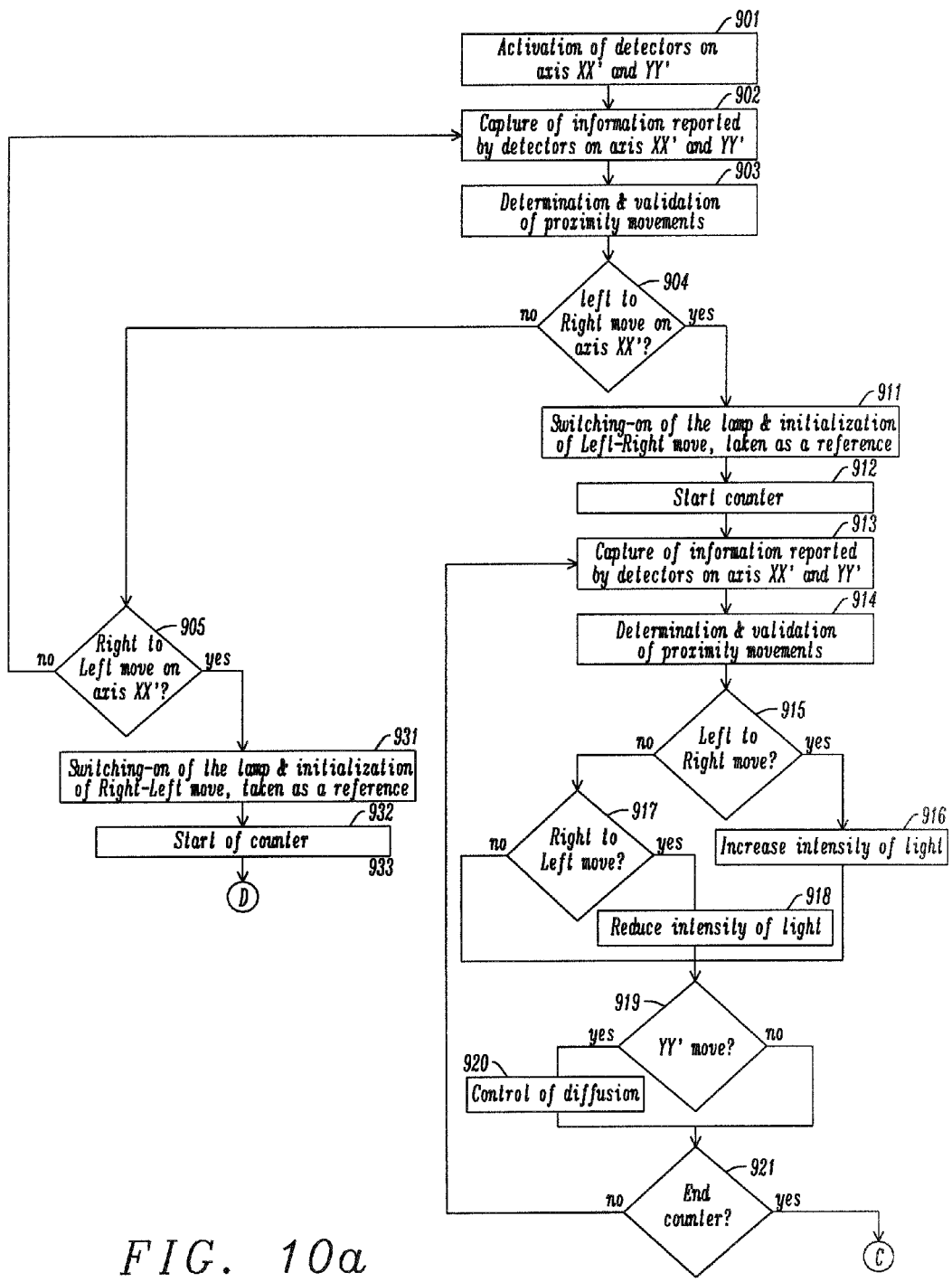
FIGS. 10a and 10b illustrate an embodiment of a process for controlling the light power but also the diffusion of the light beam.
Figure 10B:
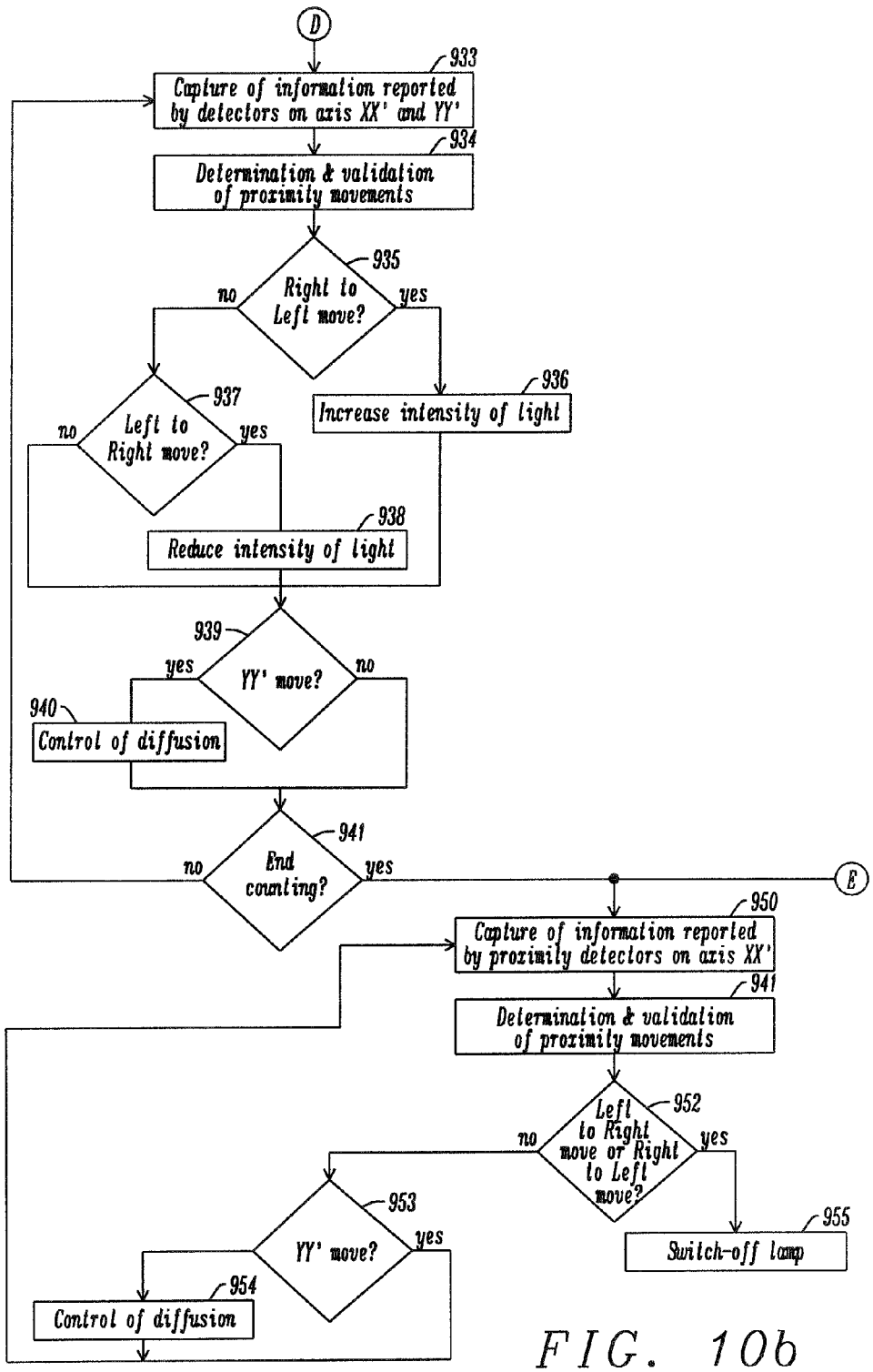

FIGS. 10a and 10b illustrate an embodiment of a process for controlling the light power together with the diffusion power of the light beam.

The process starts with a step 901 consisting of the activation of detectors positioned on two axes XX' and YY'.

Then the process proceeds with a step 902 in which control module 10 performs the capture of the information detected by detectors 50-x1, 50-x2 located on axis XX', but also the capture of information generated by detectors 50-y1 and 50-y2 positioned on the axis YY'.

Then the process proceeds in a step 903 with an analysis of detected information, in order to operate a validation of such detected information and finally determine the existence of a proximity movement in front of the lamp together with the actual direction of such movement.

In a step 904, the process performs a test to determine if a movement from the left to the right has been detected and validated, in which case, the process proceeds to a step 911 and, otherwise, the process goes to a step 905.

In step 911, the process performs a switching-on of the lamp and the initialization of the latter so as to consider the direction LEFT-RIGHT as a reference serving for determining the direction used for increasing the light intensity.

Then, in a step 912, the process launches a timer so as to establish a time window used for allowing the user to adjust the power of the light beam generated by the lamp.

The process then proceeds to a step 913, wherein control module 10 performs the capture of the information generated by proximity detectors 50-x1 and 50-x2.

Then the method continues with a step 914, consisting in the identification and the validation of a proximity movement potentially detected by detectors 50-x1 and 50-x2.

Step 915 is a test for comparing the direction of the second movement detected in step 914 with respect to the move which was tested in step 904, and taken as a reference. Thus, if the second movement is identified as a movement from Left to Right, then the process continues with a step 916 and, otherwise, proceeds to a step 917.

In step 916, the process proceeds to an increase of the light intensity of the lamp by means of a suitable control information or control signal $V_c$ which is then transmitted to power module 20. Then the process goes to step 919.

In step 917, the process performs a test of the second movement which was potentially identified movement and determines whether the movement is a movement from Right to Left, in which case the process continues with a step 918 and, otherwise, goes to a step 919.

In step 918, control module 10 performs a reduction of the intensity of the light generated by the lamp. The process then continues with a step 919.

Step 919 is a test to determine if the information reported, analyzed and validated by control module 10 can identify and validate a movement along the axis YY 'perpendicular to the axis XX', in which case the movement is used to change the diffusion level of the lamp, in a step 920. In practice, one can decide to proceed with a predefined increase of the level of diffusion when a DOWN-UP move is detected and validated. Practically, no error in the direction YY' is to be expected when the user positions the lamp on his/her head (in contrary to the direction XX'), so that one may consider the direction DOWN-UP to be an absolute reference used for determining a positive increment of the level of diffusion of the lamp. Any other mechanism remains possible. The process then continues with a step 921.

If no proximity movement is identified/validated along axis YY', the process proceeds to a step 921 which is a test to determine if it reaches the end of the count corresponding to the closing of the time window established in in step 912.

As is not the end of its count, the process returns to step 913, thereby allowing the user to continue the adjustment of the lamp parameters, including the light power and the level of diffusion of the light beam.

In contrast, if the time window closes, for example after 30 seconds, the process continues with a step 950 which is a first step of a final sequence of steps 950-954 allowing the user to switch-off the lamp.

If the test of step 904 did not reveal an proximity move from Left to the Right, the process continues with a step 905 for determining whether, conversely, a movement from Right to Left has been identified and validated, in which case the process goes to a step 931 and, otherwise, returns to step 902.

In step 931, the process proceeds to the switching-on of the lamp and initializes it with the right-left movement taken as a reference direction corresponding to a positive increment of the light power.

In a step 932, the process proceeds with the launching of a counter so as to open a time window which can be used for allowing adjustment of the parameters (including light power and diffusion ratio) of the lamp.

Then the process continues with a step 933 wherein control module 10 captures the information generated by proximity detectors 50-x1 and 50-x2, as well as 50-y1 and 50-y2.

Then the process continues with the validation of this information in order to determine a new proximity move in a step 934, the direction of which being tested in a step 935.

If the new direction of move corresponds to a move from Right to Left, in step 935, the process proceeds to a step 936, and otherwise, proceeds to a step 937.

In step 936, control module 10 generates a suitable control information or control signal to be transmitted to power module 20 so as to increase the intensity of the light by a predetermined fraction. The process then continues with step 939.

In a step 937, the process determines whether the identified/validated proximity move is a move from Left to Right, in which case, the process goes to a step 938 and, otherwise, proceeds to a step 939.

In step 938, control module generates a control information for the purpose of reducing the light intensity of the lamp, and the process then proceeds to step 939.

Step 939 is a test to determine if the information reported, analyzed and validated by control module 10 can identify a proximity movement along axis YY' being perpendicular to axis XX', in which case the movement is used to change, in a step 940, the level of diffusion of the lamp generated by PDLC. As before, we can proceed to a predefined increase of the diffusion coefficient when a DOWN-UP move is identified and validated. The process then continues with step 941.

If no movement is identified along axis YY', the process then proceeds to step 941 which is a test for determining the expiration of the counter initiated in step 932 and corresponding to the time window which was established.

If the count comes to an end, the process continues with a step 950 and, otherwise, the method returns to step 933 allowing the user to continue the adjustment of the parameters of the lamp.

In step 950, control module 10 performs the capture of the information generated by proximity detectors 50-x1 and 50-x2, as well as detectors 50-y1 and 50-y2.

Then in a step 951, this information is analyzed and validated to determine a proximity motion, for example along axis XX'.

Step 952 is a test to determine whether a type of movement near Right-Left or Left-Right is identified and validated, in which case the process continues with the switching-off of the lamp in a step 953.

As it can be seen on the different examples described above, one can thus achieve quite a particularly sophisticated control of a lamp, and thus without the need of any manual switch. Thanks to the numerous phases of analysis and validations executed by the algorithms included in control module 10—such as those of steps 903, 913, 934, 951 etc. . . . a limited number of undesired switching-on/off is obtained.

This is also a great advantage presented by the invention.

What is claimed is:

1. A portable lamp having a control of the light power, comprising:
   a power module for powering one or more light sources;
   first proximity detectors for detecting a finger moving close to the lamp, in one direction or another along a first axis X-X', wherein said first proximity detectors are located on the same side, either on the left or the right, relative to said light source;
   a control module receiving information generated by said first proximity detectors, said control module being configured for generating, from the direction of the movement of said finger, a control information for switching-on, switching-off or adjusting the level of the intensity of the light power, wherein the first direction of the move of the finger that was used for switching on the lamp is used as a reference for determining the positive direction of variation of the intensity of the light power, wherein all proximity detectors are located on a same axis X-X' located on both sides of said light sources.

2. The portable lamp according to claim 1 wherein all proximity detectors are located on a same axis X-X' at one side of said light source.

3. The portable lamp according to claim 1 wherein said proximity detectors comprise each an antenna configured for modifying the oscillation frequency of an oscillator when an object comes close to said detectors.

4. The portable lamp according to claim 1 wherein said proximity detectors comprise an ultrasonic sensor configured for detecting the proximity of an object coming close to said lamp.

5. The portable lamp according to claim, 1 further comprising:
   second proximity detectors configured for detecting and distinguishing a movement Up-Down or Down-Up along a second axis Y-Y' substantially vertical.

6. The portable lamp according to claim 5 further comprising a control module for controlling the diffusion of the light beam, and wherein said first proximity detectors are configured for controlling the intensity of the light beam, and/or the switching-on and switching-off of said lamp;
   wherein said second proximity detectors are configured for controlling the diffusion of the light beam.

7. The portable lamp according to claim 6 wherein a Polymer Dispersed Liquid Crystal (PDLC) element performs the control of the diffusion of the light beam, said PDLC element being controlled by said control module from information generated by said second proximity detectors detecting a move of an object along said axis Y-Y'.

8. The portable lamp according anyone of claim 1 wherein said lamp is a headlamp.

9. A process for controlling a portable lamp, having a control of the light power, comprising:
   a power module for powering one or more light sources;
   first proximity detectors for detecting a finger moving close to the lamp, in one direction or another along a first axis X-X', wherein said first proximity detectors are located on the same side, either on the left or on the right, relative to said light source;
a control module receiving information generated by said first proximity detectors, said control module being configured for generating, from the direction of the movement of said finger, a control information for switching-on, switching-off or adjusting the level of the intensity of the light power, comprising the steps of:
detecting a first proximity move of type left/right or right/left and controlling the switching-on of said lamp;
initiating a counter for establishing a time window used for allowing adjustment of the intensity of the light beam, said time window being opened during a predetermined duration;
detecting a second proximity move during the opening of said time window;
comparing the direction of said second proximity move with the direction of said first proximity move and:
 increasing the light intensity of the lamp when the direction of the second proximity move is the same than the direction of the first proximity move;
 reducing the light intensity of the lamp when the direction of said second proximity is reverse with respect to the direction of said first proximity move;
switching off the lamp for any proximity move detected after the closing of said time window wherein all proximity detectors are located on a same axis X-X' located on both sides of said light sources.

10. The process for controlling a portable lamp claimed in claim 9 further comprising the step of detecting a move along an axis Y-Y' being perpendicular, for the control of a level of diffusion of the light beam passing through an optical system comprising a Polymer Dispersed Liquid Crystal (PDLC) element.

11. The process of controlling a portable lamp according to claim 9 wherein all proximity detectors are located on a same axis X-X' at one side of said light source.

12. The process of controlling a portable lamp according to claim 9 wherein said proximity detectors comprise each an antenna configured for modifying the oscillation frequency of an oscillator when an object comes close to said detectors.

13. The process of controlling a portable lamp according to claim 9 wherein said proximity detectors comprise an ultrasonic sensor configured for detecting the proximity of an object coming close to said lamp.

14. The process of controlling a portable lamp according to claim 9 further comprising:
second proximity detectors configured for detecting and distinguishing a movement Up-Down or Down-Up along a second axis Y-Y' substantially vertical.

15. The process of controlling a portable lamp according to claim 14 further comprising a control module for controlling the diffusion of the light beam, and wherein said first proximity detectors are configured for controlling the intensity of the light beam, and/or the switching-on and switching-off of said lamp;
wherein said second proximity detectors are configured for controlling the diffusion of the light beam.

16. The process of controlling a portable lamp according to claim 15 wherein a Polymer Dispersed Liquid Crystal (PDLC) element performs the control of the diffusion of the light beam, said PDLC element being controlled by said control module from information generated by said second proximity detectors detecting a move of an object along said axis Y-Y'.

17. A portable lamp having a control of the light power, comprising:
a power module for powering one or more light sources;
first proximity detectors for detecting a finger moving close to the lamp, in one direction or another along a first axis X-X';
a control module receiving information generated by said first proximity detectors, said control module being configured for generating, from the direction of the movement of said finger, a control information for switching-on, switching-off or adjusting the level of the intensity of the light power,
further comprising second proximity detectors configured for detecting and distinguishing a movement Up-Down or Down-Up along a second axis Y-Y' substantially vertical.

18. The portable lamp according to claim 17 further comprising a control module for controlling the diffusion of the light beam, and
wherein said first proximity detectors are configured for controlling the intensity of the light beam, and/or the switching-on and switching-off of said lamp;
wherein said second proximity detectors are configured for controlling the diffusion of the light beam.

19. The portable lamp according to claim 18 wherein a Polymer Dispersed Liquid Crystal (PDLC) element performs the control of the diffusion of the light beam, said PDLC element being controlled by said control module from information generated by said second proximity detectors detecting a move of an object along said axis Y-Y'.

20. A process for controlling a portable lamp, having a control of the light power comprising:
a power module for powering one or more light sources;
first proximity detectors for detecting a finger moving close to the lamp, in one direction or another along a first axis X-X';
a control module receiving information generated by said first proximity detectors, said control module being configured for generating, from the direction of the movement of said finger, a control information for switching-on, switching-off or adjusting the level of the intensity of the light power,
comprising the steps of:
detecting a first proximity move of type left/right or right/left and controlling the switching-on of said lamp;
initiating a counter for establishing a time window used for allowing adjustment of the intensity of the light beam, said time window being opened during a predetermined duration;
detecting a second proximity move during the opening of said time window;
comparing the direction of said proximity move with the direction of said first proximity move and;
 increasing the light intensity of the lamp when the direction of the second proximity move is the same than the direction of the first proximity move;
 reducing the light intensity of the lamp when the direction of said second proximity is reverse with respect to the direction of said first proximity move;
switching off the lamp for any proximity move detected after the closing of said time window,
further comprising the step of detecting a move along an axis Y-Y' being perpendicular, for the control of a level of diffusion of the light beam passing through an optical system comprising a Polymer Dispersed Liquid Crystal (PDLC) element.

21. A process for controlling a portable lamp, having a control of the light power comprising:
a power module for powering one or more light sources;
first proximity detectors for detecting a finger moving close to the lamp, in one direction or another along a first axis X-X';
a control module receiving information generated by said first proximity detectors, said control module being configured for generating, from the direction of the movement of said finger, a control information for switching-on, switching-off or adjusting the level of the intensity of the light power,
comprising the steps of:
detecting a first proximity move of type left/right or right/left and controlling the switching-on of said lamp,
initiating a counter for establishing a time window used for allowing adjustment of the intensity of the light beam, said time window being opened during a predetermined duration;
detecting a second proximity move during the opening of said time window;
comparing the direction of said second proximity move with the direction of said first proximity move and:
increasing the light intensity of the lamp when the direction of the second proximity move is the same as the direction of the first proximity move;
reducing the light intensity of the lamp when the direction of said second proximity is reverse with respect to the direction of said first proximity move;
switching off the lamp for any proximity move detected after the closing of said time window,
wherein said portable lamp further comprises second proximity detectors configured for detecting and distinguishing a movement Up-Down or Down-Up along a second axis Y-Y' substantially vertical.

22. The process of controlling a portable lamp according to claim 21 further comprising a control module for controlling the diffusion of the light beam, and wherein said first proximity detectors are configured for controlling the intensity of the light beam, and/or the switching-on and switching-off of said lamp;
wherein said second proximity detectors are configured for controlling the diffusion of the light beam.

23. The process of controlling a portable lamp according to claim 22 wherein a Polymer Dispersed Liquid Crystal (PDLC) element performs the control of the diffusion of the light beam, said PDLC element being controlled by said control module from Information generate by said proximity detectors detecting a move of an object along said axis Y-Y'.

* * * * *